June 19, 1956  R. P. COLLETTE ET AL  2,750,971
GUARD FOR PORTABLE ROUTER
Filed April 15, 1954
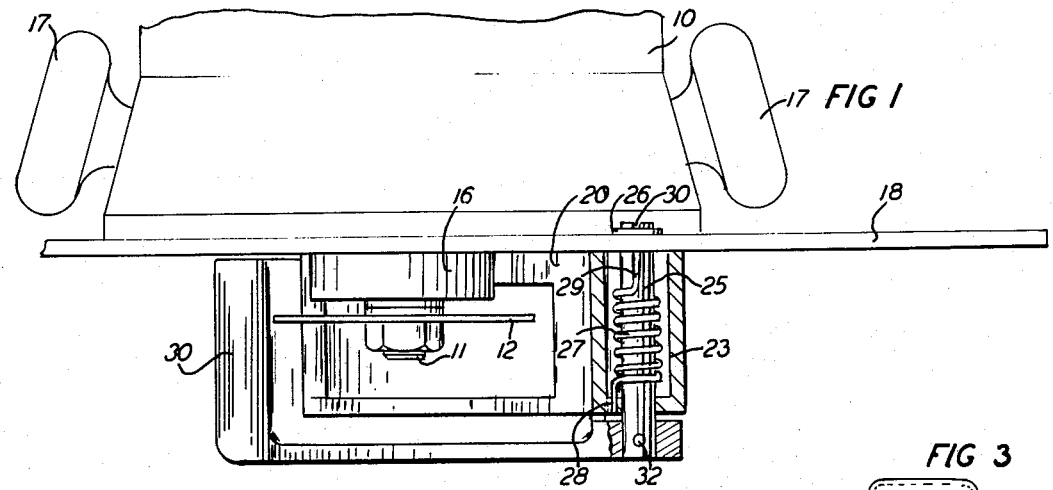
FIG 1
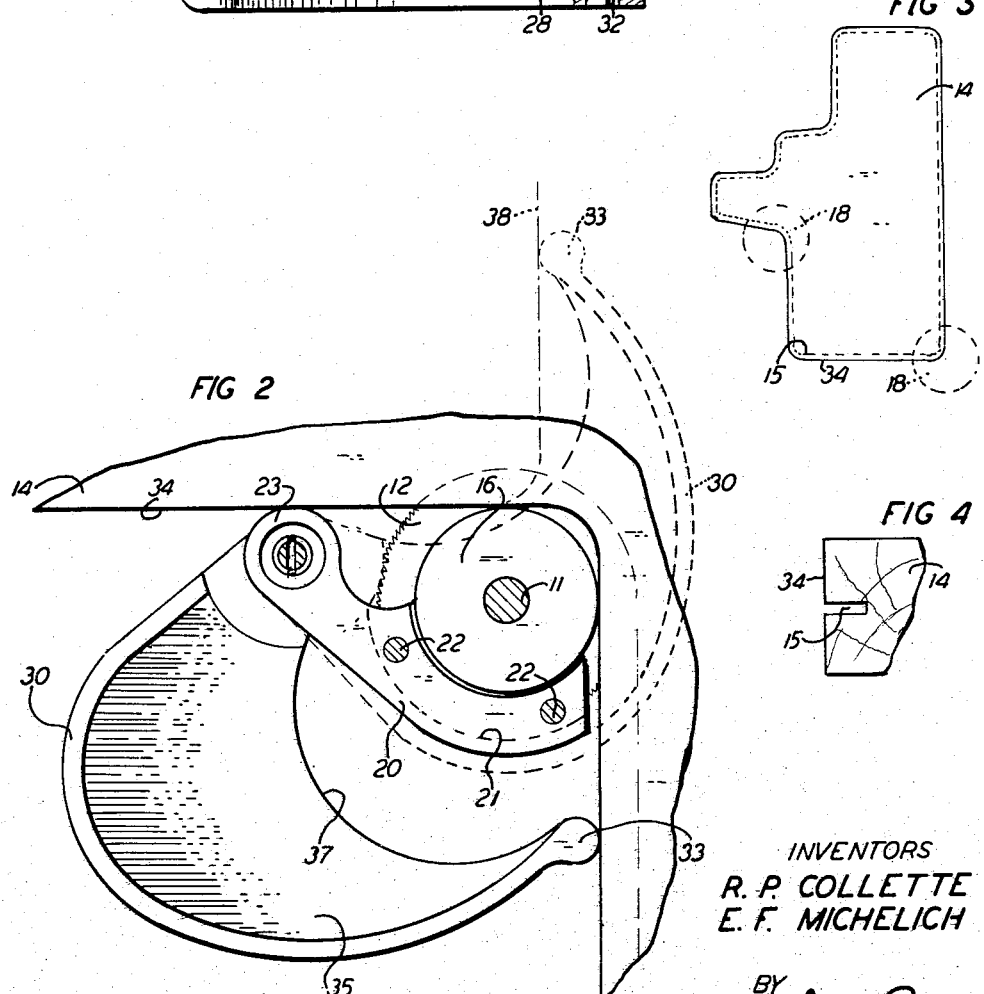
FIG 2
FIG 3
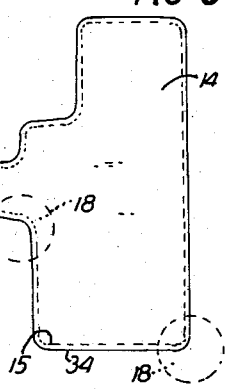
FIG 4
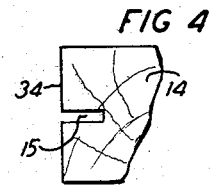
INVENTORS
R. P. COLLETTE
E. F. MICHELICH
BY
ATTORNEY

United States Patent Office 2,750,971
Patented June 19, 1956

2,750,971

GUARD FOR PORTABLE ROUTER

Robert P. Collette, Bronxville, and Edward F. Michelich, Brooklyn, N. Y., assignors to Western Electric Company, Incorporated, New York, N. Y., a corporation of New York Application April 15, 1954, Serial No. 423,460

5 Claims. (Cl. 144—251)

This invention relates to portable routers and more particularly to guards therefor.

Although certain types of guards are provided for router cutters, they are only partially effective and, in various instances, while the router is in use, the cutter has various exposed segments which should be provided with a protective guard.

The object of the present invention is a simple yet highly efficient improvement in portable routers.

With this and other objects in view, the invention comprises the improvement of the commercial portable router through the addition of a guide plate of sufficient size to assure accurate support on an article or panel whose edges are to be cut and the provision of maximum guarding means for the cutter.

In the present embodiment of the invention, an arcuate spring loaded guard having one end pivotally mounted on the guide plate at one side of the cutter and a free end held in engagement with the edge of a workpiece at the opposing side of the cutter, is provided with a side portion normally covering the major portion of the cutter with an arcuate surface or edge positioned whereby the guard may lead or trail the cutter around external corners.

Other objects and advantages will be apparent from the following detailed description when considered in conjunction with the accompanying drawing, wherein:

Fig. 1 is a fragmentary side elevational view of a router embodying the invention;

Fig. 2 is a top plan view of the structure shown in Fig. 1 with the main portion of the router and the guide plate removed illustrating the cutter and different positions of the movable guard;

Fig. 3 is a side elevational view of a panel illustrating the different contours of the edges thereof along which the router is to be moved; and Fig. 4 is an enlarged fragmentary sectional view of a portion of the panel.

Referring now to the drawing, attention is first directed to Fig. 1 which illustrates a router 10, having an electric motor (not shown) for driving a shaft 11 on which a cutter 12 is fixedly mounted at any desired position depending upon the position the cut is to be made, for example, in a panel 14 as illustrated at 15. A stationary collar 16, which may vary in diameter with respect to the diameter in the cutter 12 to determine the depth of the cut 15 in the edge of the work or panel 14 is mounted on the shaft 11. The router 10 is provided with suitable handles 17 through the aid of which it may be moved relative to the work. In the present embodiment of the invention, a guide plate 18, larger in diameter than the conventional guide plate, is mounted on the undersurface of the main housing of the router 10.

A stationary guard 20, having an arcuately grooved portion 21 partially surrounding a segment of the cutter 12, is fixed to the guide plate 18 by means of screws or the like 22 and has a hollow integral cylindrical portion 23. A spindle 25 is rotatably mounted in the portion 23 and an aligned aperture in the guide plate 18 where it is provided with a collar 26 or any other suitable means to hold it against axial movement but to permit rocking movement thereof. A helical spring 27, having an end 28 fixed to the portion 23 of the fixed guard 20 and the other end 29 extending through a slot 30 in the spindle 25, serves to normally urge the spindle counterclockwise, looking down from the top thereof.

A movable guard 30, arcuate in general contour, is pivotally supported at one end by being secured at 32 to the outer end of the spindle 25 while its free end is provided with a nose 33 rounded (as shown in Fig. 2) to move freely on the edge 34 of the work 14. The guard 30 has an open side adjacent the guide plate 18 while a member 35 closes the other side thereof sufficiently so that normally, the major portion of the cutter 12 is covered. By viewing the broken line position of the movable guard 30, it will be observed that the curvature thereof tends to conform for a given distance to the adjacent curvature of the fixed guard 20 and to rest there again, normally under the force of a spring 27. However, the curvature of the movable guard 20 extends beyond the cutter, in this position, a distance substantially equal the diameter of the cutter to provide suitable advance and trailing guarding means for the cutter. An arcuate surface or edge 37 of the member 35 of the guard is adapted in certain instances to cooperate with the nose 33 in travelling around external corners in engagement with the edge of the work.

Considering now the operation of the portable router, as illustrated in the drawings, it should be understood that the router may be moved in either direction utilizing the collar 16 and the surface of the cylindrical portion 23 as guides on the edge 34 of the work while the guide plate 18 rests on the outer surface of the article in determining the position of the cutter as the portable router is moved in a path determined by the contour of the edge of the work.

Observing Fig. 2, attention is directed to the solid line position of the guard 30 as the cutter 16 travels around an internal corner of the work, in this instance, the surface of the cylinder 23 is leading while the nose 33 of the guard is following. Although the guard 30 is positioned away from the cutter in this instance it closes an area between the operator and the cutter. Furthermore, the area immediately adjacent the cutter is covered by the fixed guard 20.

To illustrate other functions of the guard 30, attention is directed to the broken line 38 linked with the horizontal line 34 and the broken line position of the guard 30. It may be visualized that the router may be moved in either direction whereby the nose 33 of the guard will either lead the way or follow. If it leads away when approaching an external corner it will be moved around the corner keeping in contact with the surface of the article and completely guarding against personal contact with the cutter while the cutter finishes its movement to and around the corner. Furthermore, if the nose 33 follows the cutter, it will be apparent that the guard 30 will allow the cutter to move around an external corner while the guard continues to engage the surface at right angles, or at any angle with respect thereto, to assure maximum guarding of the cutter regardless of the contour of the surface being cut or the direction in which the router is moved to perform this result.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. The combination with a portable router having a driven rotatable cutter, of a guide plate mounted on the router in a plane perpendicular to the axis of the cutter and spaced a predetermined distance from one side thereof, a fixed guard mounted on the guide plate, at the operator's side of the cutter, with an arcuate portion surrounding a segment of the cutter and a hollow work engaging portion spaced from the cutter, a movable arcuate guard normally resting against and partially conforming to the fixed guard with a free work engaging end and a pivotal end, a spindle carried by the hollow portion of the fixed guard to support the movable guard at the pivotal end thereof, and a spring urging the movable guard toward its normal position and causing the free end of the movable guard to engage the work and selectively lead or follow the cutter.

2. The combination with a portable router having a driven rotatable cutter, of a guide plate mounted on the router in a plane perpendicular to the axis of the cutter and spaced a predetermined distance from one side thereof, a fixed guard mounted on the guide plate, at the operator's side of the cutter, with an arcuate portion surrounding a segment of the cutter and a hollow work engaging portion spaced from the cutter, a movable arcuate guard normally resting against and partially conforming to the fixed guard with a free work engaging end and a pivotal end, a spindle carried by the hollow portion of the fixed guard to support the movable guard at the pivotal end thereof, and a spring urging the movable guard toward its normal position and causing the free end of the movable guard to engage the work and selectively lead or follow the cutter, the movable guard having a side member substantially closing the area between the ends farthest from the guide plate.

3. The combination with a portable router having a driven rotatable cutter, of a guide plate mounted on the router in a plane perpendicular to the axis of the cutter and spaced a predetermined distance from one side thereof, a fixed guard mounted on the guide plate, at the operator's side of the cutter, with an arcuate portion surrounding a segment of the cutter and a hollow work engaging portion spaced from the cutter, a movable arcuate guard normally resting against and partially conforming to the fixed guard with a free work engaging end and a pivotal end, a spindle carried by the hollow portion of the fixed guard to support the movable guard at the pivotal end thereof, and a spring urging the movable guard toward its normal position and causing the free end of the movable guard to engage the work and selectively lead or follow the cutter, the movable guard having a side member substantially closing the area between the ends farthest from the guide plate, said side member having an arcuate surface cooperating with the free end to guide the movable guard around external corners.

4. The combination with a portable router having a driven rotatable cutter and diametrically opposed handles disposed between a cutting side and an operator's side, of a guide plate mounted on the router in a plane perpendicular to the axis of the cutter and spaced a predetermined distance from one side thereof, a guide fixed to the guide plate to ride on the edge of work to control the depth of cut by the cutter therein, a fixed guard mounted on the guide plate, at the operator's side of the cutter, with an arcuate portion surrounding a segment of the cutter and a hollow work engaging portion spaced from the fixed guide and cooperating therewith to guide the cutter relative to work, a movable arcuate guard disposed largely on the operator's side of the cutter and adapted to extend the full length of the fixed guard and around the major portion of the cutter including part of the cutting side, the movable guard having a pivotal end and a work engaging end, a spindle carried by the hollow portion of the fixed guard to support the movable guard at the pivotal end thereof, and a spring urging the movable guard toward its normal position in engagement with the fixed guard and causing the free end of the movable guard to engage the work and selectively lead or follow the cutter.

5. The combination with a portable router having a driven rotatable cutter and diametrically opposed handles disposed between a cutting side and an operator's side, of a guide plate mounted on the router in a plane perpendicular to the axis of the cutter and spaced a predetermined distance from one side thereof, a guide fixed to the guide plate to ride on the edge of work to control the depth of cut by the cutter therein, a fixed guard mounted on the guide plate, at the operator's side of the cutter, with an arcuate portion surrounding a segment of the cutter and a hollow work engaging portion spaced from the fixed guide and cooperating therewith to guide the cutter relative to work, a movable arcuate guard disposed largely on the operator's side of the cutter and adapted to extend the full length of the fixed guard and around the major portion of the cutter including part of the cutting side, the movable guard having a pivotal end and a work engaging end, a spindle carried by the hollow portion of the fixed guard to support the movable guard at the pivotal end thereof, and a spring urging the movable guard toward its normal position in engagement with the fixed guard and causing the free end of the movable guard to engage the work and selectively lead or follow the cutter, the movable guard having a side member substantially closing the area between the ends thereof and having an arcuate surface cooperating with the free end to guide the movable guard around external corners.

References Cited in the file of this patent

UNITED STATES PATENTS

| | | |
|---|---|---|
| 1,216,340 | Mattison | Feb. 20, 1917 |
| 1,271,618 | Reese | July 9, 1918 |
| 1,621,146 | Welp | Mar. 15, 1927 |
| 2,346,961 | Gundelfinger et al. | Apr. 18, 1944 |
| 2,502,656 | Koett | Apr. 4, 1950 |
| 2,659,399 | Doug | Nov. 17, 1953 |